United States Patent
Napolitano et al.

(10) Patent No.: US 6,219,693 B1
(45) Date of Patent: Apr. 17, 2001

(54) FILE ARRAY STORAGE ARCHITECTURE HAVING FILE SYSTEM DISTRIBUTED ACROSS A DATA PROCESSING PLATFORM

(75) Inventors: Richard Napolitano, Hollis, NH (US); Herbert W. Silverman, Newport Coast, CA (US); Chester Juzsczak, Merrimack, NH (US); Bryan K. Panner, Nashua, NH (US); Chris Franklin, Merrimack, NH (US); Eric S. Noya, Groton, MA (US); Timothy Lee Hoskins, Amherst, NH (US); Stanley Luke, Acton, MA (US); Paul Richard Shaughnessy, Hollis, NH (US); Alexander C. McLeod, Brookline, NH (US); Randy Marc Arnott, Mount Vernon, NH (US); Jeffrey T. Wong, Newton, MA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 08/964,304

(22) Filed: Nov. 4, 1997

(51) Int. Cl.$^7$ .................................................. G06F 13/00
(52) U.S. Cl. .......................... 709/203; 710/33; 710/129; 710/36; 709/201; 709/211; 709/216; 709/217
(58) Field of Search .................................. 710/126, 129, 710/110, 241, 5, 6, 8, 10, 36, 38, 62, 63, 101, 107, 33, 35, 52, 57; 709/201–203, 213–215, 217–219, 227–229, 249–250, 211

(56) References Cited

U.S. PATENT DOCUMENTS

| | | | |
|---|---|---|---|
| 5,163,131 | 11/1992 | Row et al. | 395/200 |
| 5,463,772 | * 10/1995 | Thompson et al. | 395/600 |
| 5,519,853 | 5/1996 | Moran et al. | 395/494 |
| 5,758,084 | * 5/1998 | Silverstein et al. | 709/228 |
| 5,819,077 | * 10/1998 | Koga et al. | 395/561 |
| 5,826,046 | * 10/1998 | Nguyen et al. | 710/129 |
| 5,889,944 | * 3/1999 | Butt et al. | 709/203 |
| 5,892,969 | * 4/1999 | Young | 710/5 |
| 5,913,028 | * 6/1999 | Wang et al. | 709/203 |
| 5,933,824 | * 8/1999 | DeKoning et al. | 707/8 |
| 5,987,476 | * 11/1999 | Imai et al. | 707/201 |

* cited by examiner

Primary Examiner—Ayaz R. Sheikh
Assistant Examiner—Raymond N. Phan
(74) Attorney, Agent, or Firm—Cesari and McKenna, LLP

(57) ABSTRACT

A file away storage architecture comprises a file system that is distributed across a data processing platform consisting of a host computer coupled to an adapter over a high-speed, low latency interface and an input/output subsystem that is located entirely on the adapter. The distributed nature of the architecture enables implementation of the file system in accordance with a modified client-server computing model; that is, the architecture includes a client file system executing on the host computer and a server file system executing on the adapter.

24 Claims, 11 Drawing Sheets

FILE ARRAY STORAGE ARCHITECTURE HAVING FILE SYSTEM DISTRIBUTED ACROSS A DATA PROCESSING PLATFORM

FIELD OF THE INVENTION

This invention relates generally to operating systems and, more specifically, to a distributed storage architecture of an operating system.

BACKGROUND OF THE INVENTION

An operating system is a large, complex piece of software whose primary function is the management of hardware and software resources of a data ;processing system such as processors, memory and storage. Storage management, in turn, involves the organization of storage devices, such as disks, into logical groupings to achieve various performance and availability characteristics. For example, the disks may be arranged to create individual volumes or concatenations of volumes, mirror sets or stripes of mirror sets, or even redundant arrays of independent disks (RAID). The data processing platform on which the operating system executes to provide such management functions typically includes a host computer coupled to a storage adapter or controller. The operating system functionally organizes this platform by, inter alia, invoking input/output (I/O) operations in support of software processes or applications executing on the computer.

A storage architecture of the operating system decomposes management of the storage devices into individual components and defines their functional operations with respect to the flow of information and control among them. The individual components include an I/O subsystem and a file system, each of which is generally independent of one another and interact according to interfaces defined by the architecture. The I/O subsystem provides an efficient mode of communication between the computer and the disks that allows programs and data to be entered into the memory of the computer for processing; the subsystem also enables the results obtained from computations of that information to be recorded on the disks.

The file system contains general knowledge of the organization of information on the storage devices and provides algorithms that implement properties/performance of the desired storage architecture. To that end, the file system is a high-level software entity comprising a collection of program modules, e.g., software drivers, that incorporate a command set for the storage devices/disks. Typically, the operating system implements a file system to logically organize the information as a hierarchical structure of files on the disks.

I/O processing is typically performed under the auspices of the file system in that applications typically interact with the file system to manipulate (i.e., read or write) the files. I/O subsystems, on the other hand, interact with disks at lower software levels by manipulating blocks of data. Accordingly, a single I/O transaction operation issued by an application to the file system may spawn into many I/O transfer operations between the I/O subsystem and disks; that is, there may be multiple data transfers between the lower-layer software entities and the actual hardware devices.

Requests to perform I/O transactions are generally serial in nature. Upon requesting data to be read from or written to a file, the application program typically suspends execution and the request is processed by the file system and I/O subsystem. The file system and I/O subsystem are composed of many layers of software driver code that is commonly referred to as an I/O stack. FIG. 1 is a schematic block diagram of a conventional I/O stack 100 comprising a file system driver 102, a logical volume driver 104, a disk class driver 106 and device-specific drivers, such as small computer system interface (SCSI) port and miniport drivers 108, 110.

The organization of a file system and I/O subsystem within a hardware platform vary among conventional storage architectures. FIG. 2A is a block diagram of a traditional storage architecture 200 having a file system 202 and I/O subsystem 204 that are organized to execute entirely on a host computer 206. In response to an IO transaction request issued by an application, the host processor executes the software code of the file system and I/O subsystem needed to transfer data from disk to the host memory. In this architecture, the host processor actually executes the code of the I/O stack twice for the I/O transaction: once as the transaction descends the stack and again as the results of the transaction are returned to the application. Execution of I/O operations for this type of architecture clearly consumes significant computer resources.

To avoid such consumption of resources, some storage architectures alter the arrangement of their file systems and I/O subsystems. FIG. 2B illustrates a conventional RAID controller architecture 210 wherein the file system 212 is contained within the host computer 216 and the I/O subsystem 214 is distributed between the host computer and controller 218. Most implementations of this architecture are configured to execute RAID-related operations by transferring discrete block-oriented requests between the file system and controller. When these requests complete, however, the host processor is notified by means of interrupts, i.e., events that change the normal flow of instruction execution by the host processor. For this type of architecture, there may be many interrupts associated with a single transaction; since each interrupt must be serviced by the host processor, this architecture results in inefficient use of the processor.

Other storage architectures provide their file systems and I/O subsystems entirely on the controller. The host computer 226 of FIG. 2C interacts with the controller 228 in accordance with a conventional client-server computing model 220 wherein the host computer ("client") forwards each I/O transaction to the controller ("server") typically across an interconnection such as a network; notably, all transactions are sent to the controller and none are serviced locally at the host computer. An example of such an architecture is described in U.S. Pat. No. 5,163,131 titled Parallel I/O Network File Server Architecture by Edward J. Row et al, issued on Nov. 10, 1992.

Row discloses a server-specific I/O architecture that is optimized for file operations of a Unix file server. The file server architecture comprises one or more network controllers, one or more file controllers, one or more storage processors, and a memory interconnected by a message passing bus and operating in parallel with the Unix host. Client requests for file operations are transmitted to a file controller which, independently of the Unix host, manages a virtual file system of a mass storage device coupled to the storage processors. Although this architecture relieves the host processor from I/O processing, it also adversely affects file system latency, i.e., the period of time between the issuance of an I/O transaction request by an application to the file system and the completion of that request by the file system.

In general, file system latency increases with an architecture having a file system that is remote from the processing platform on which the application executes; another example of such an architecture is described in U.S. Pat. No. 5,463,772 titled Transparent Peripheral File Systems with On-board Compression, Decompression and Space Management by Bruce A. Thompson et al, issued on Oct. 31, 1995. Here, a peripheral file system is disclosed that may be embedded in a mass storage device, a lump in an interconnecting interface cable or on a smart interface card in the backplane of a host computer. Since Thompson discloses a file system that is remote from the host, file system latency is again affected. Latency of an I/O request is a determinative indication of overall file system performance and the present invention is directed to reducing file system latency.

In a conventional client-server computing environment, I/O capacity and storage management are also significant issues, particularly for the server. I/O capacity is defined as throughput at a certain latency, e.g., 500 megabits per second at a latency not to exceed 10 milliseconds. Customers typically purchase servers to support a predetermined number of clients at a predetermined I/O capacity. As their organizations grow, however, these customers may add more clients to the server; as a result, the server may not be able to generate sufficient capacity to meet the demands of the clients and the server becomes a bottleneck. The present invention is further directed to alleviating this server bottleneck problem.

Therefore, it is an object of the present invention to provide a storage architecture of a data processing system that increases the efficiency of a host computer processor.

Another object of the present invention is to provide a storage architecture of a data processing system that is scalable in terms of I/O capacity and bandwidth.

Yet another object of the present invention is to provide a file system of a data processing system that improves file system latency and overall system performance.

Still yet another object of the present invention is to provide a file system of a data processing system that decreases use of a host computer processor and memory for I/O operations.

SUMMARY OF THE INVENTION

The invention relates to a file array storage architecture comprising a file system that is distributed across a data processing platform consisting of a host computer coupled to a file array adapter over a high-speed, low latency interface and an input/output (I/O) subsystem that is located entirely on the adapter. The distributed nature of the architecture enables implementation of the file system in accordance with a modified client-server computing model that improves file system latency; that is, the architecture includes a client file system executing on the host computer and a server file system executing on the adapter.

In accordance with the invention, the client file system interacts initially with a cache memory of the host computer to resolve an I/O transaction request at the host computer. As a result of the various caching strategies described herein, data associated with the transaction request is likely to be present in the host cache; if so, the request can be serviced quickly and efficiently with reduced file system latency. In the event it cannot service the transaction, the client file system transmits the request to the server file system where the requested operation is performed by the adapter asynchronously to host computer execution; the file array adapter thus functions as a parallel processor of the computer system. The results of the adapter processing are then returned to the client via a response message over the interface. The server file system embodies underlying resources that enable such asynchronous operation so as to provide high data availability and increased system bandwidth while reducing host computer interruption.

Specifically, the server satisfies I/O transactions received from the client by issuing detailed requests to a file array cache manager and container manager of the file array adapter. The container manager is a software entity that manages containers and oversees certain operations, such as parity calculations. Containers consist of space from one or more disks and are the logical units of storage for the file system, as well as the units of data organization for, e.g., various RAID implementations; this allows the container manager to efficiently map file system addresses to disk addresses.

The file array cache manager is another software entity that implements a "user data" cache on the adapter to improve application performance. When data is written to the adapter cache in response to a write operation, the cache manager acknowledges the I/O request and returns control to the application without waiting for the data to be stored on disk. The file array cache manager also cooperates with the client file system to implement various caching strategies using the host and adapter caches. For example, the adapter cache may be used with the host cache in a complementary configuration to implement various adaptive algorithms that utilize adapter resources ahead of or behind .those of the host computer.

The server file system further includes a non-volatile random access memory (NVRAM) manager that interacts with a NVRAM to manipulate file system metadata and reduce disk accesses. To avoid duplicating resources, the cache manager and NVRAM manager interact to share the NVRAM as a cache for both user data and metadata. Use of the NVRAM for storage of such data improves file system availability, recovery in the event of a system crash and fault tolerance.

In another aspect of the invention, the file array architecture comprises a configuration and management utility tool that provides a graphical user interface (GUI), a command line interface and an applications programming interface for the data processing platform. This file array storage tool enables local or remote "single step" management of storage devices by a user from a console. For example, data containers may be created, deleted, expanded and promoted to multi-level containers in response to a single operation issued through the GUI.

Advantageously, the distributed nature of the file system enables implementation of the file array architecture in accordance with a modified client-server computing model that is scaleable in terms of I/O capacity and bandwidth. That is, performance of the file array system scales substantially linearly as additional file array adapters are coupled to the host computer; in contrast, the file system of a RAID storage architecture becomes a bottleneck for performance when multiple RAID controllers are added. The file array performance advantage provided by the distributed architecture is even more substantial when viewed in terms of server capacity, i.e., connecting additional clients or processing additional I/O transactions without increasing file system latency.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF ILLUSTRATIVE EMBODIMENT

Figure 3:
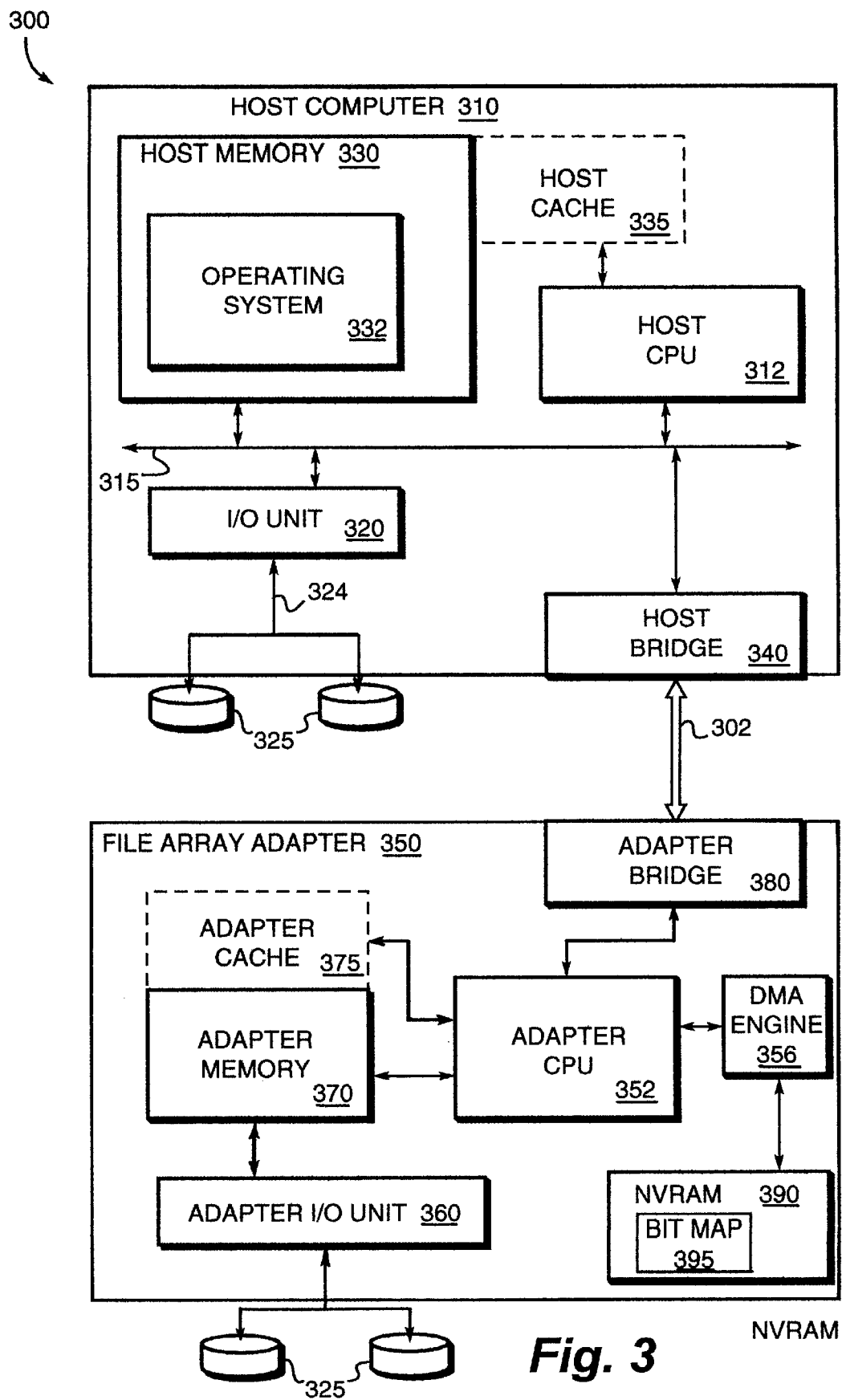
FIG. 3 is a block diagram of a data processing platform upon which a novel distributed file array storage architecture may advantageously operate.

FIG. 3 is a block diagram of a data processing platform 300 comprising a host computer 310 coupled to a file array adapter 350 over a low latency interface 302. In the illustrative embodiment described herein, the low-latency interface is preferably a peripheral component interconnect (PCI) bus that connects to the host computer 310 through a host bridge 340 and to the adapter 350 through an adapter bridge 380. The PCI bus is an open, high-speed interconnect that minimizes intervening circuitry to decrease system cost while increasing system reliability. It should be noted that other interfaces, such as the system area network (SAN) interconnection, may be advantageously used with the present invention.

The host computer 310 comprises a host central processing unit (CPU) 312, a host memory 330 and an input/output (I/O) unit 320 interconnected by a system bus 315. The I/O unit 320 is, in turn, coupled to mass storage devices, such as disks 325, via channels 324. An operating system 332, portions of which are typically resident in host memory 330 and executed by the host CPU 312, functionally organizes the computer 310 by, inter alia, invoking I/O operations in support of software processes or application programs 150 executing on the computer.

The file array adapter 350 comprises an adapter CPU 352 coupled to an adapter memory 370 and an adapter I/O unit 360, the latter containing the port circuitry needed to connect the adapter to disks 325. The adapter 350 further comprises a direct memory access (DMA) engine 356 coupled to the CPU 352 that enables the adapter to execute DMA operations with the host computer 310. That is, the DMA engine 356 transfers data directly into and out of host memory 330, thereby eliminating the need for the host CPU to participate in data transfers between the adapter memory 370 and host memory 330.

In the illustrative embodiment, the host and adapter memories generally comprise read-only and random access memory storage locations addressable by the CPUs for storing software programs and data structures associated with a novel file array storage architecture described herein. Portions of the host memory 330 and the adapter memory 370 are configured to provide a host cache 335 and an adapter cache 375, respectively, for holding most recently accessed information such as code or data. In addition, a battery-backed, non-volatile random access memory (NVRAM 390) is provided on the adapter 350 for logging transactions pertaining to both user data and "metadata", i.e., data pertaining to the file system structure. It will be apparent to those skilled in the art that other memory means, including various computer readable media, may be used for storing and executing program instructions pertaining to the inventive techniques described herein.

The File Array Architecture:

A function of the operating system 332 is the management of the data processing system storage such as caches and disks. The present invention is directed to a file array storage architecture for providing storage subsystem services, e.g., file and print services, that focus primarily on I/O capacity for such storage. In general, the file array architecture consolidates and shifts the software code boundaries of conventional storage architectures to produce a file array system comprising an I/O subsystem and a distributed file system capable of high performance. By shifting the software boundary, a substantial amount of code that is typically executed by the host CPU during I/O processing is offloaded onto the adapter thereby relieving the host computer for other functions, such as application development.

Figure 4:
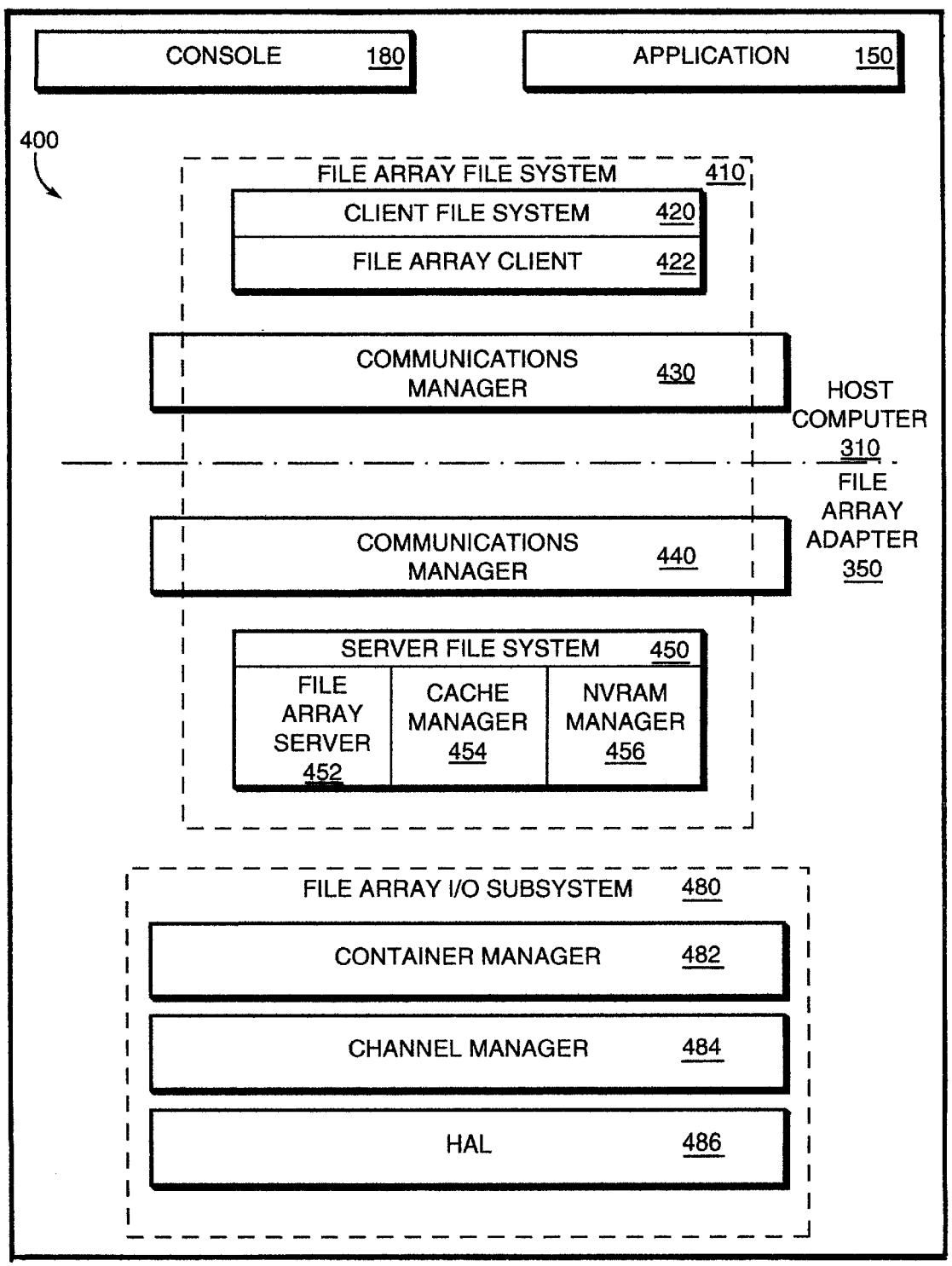
FIG. 4 is a schematic block diagram of the file array architecture comprising a client file system and a server file system in accordance with the present invention.

FIG. 4 is a schematic block diagram of the distributed file array system architecture 400 that includes a file array file system 410 which is preferably implemented in accordance with a modified client-server computing model; that is, the file system 410 includes a client file system 420 located on the host computer 310 and a server file system 450 resident on the adapter 350. In addition, the architecture includes a file array 110 subsystem 480 that is located entirely on the adapter 350; therefore, software code constituting the server file system 450 and the I/O subsystem 480 execute on the adapter CPU 352.

In the illustrative embodiment, the operating system is preferably the Windows NT operating system (hereinafter "Windows NT") developed by Microsoft Corporation. Windows NT incorporates an I/O system that provides a framework for delivering I/O requests to file systems and returning results to applications. File systems are viewed by Windows NT as sophisticated device drivers that can be dynamically loaded into the operating system; the novel file array system thus "plugs into" the Windows NT operating system at an installable file system (IFS) interface and, as a result, the I/O subsystem 480 generally replaces the Windows NT I/O system. It should be noted, however, that other operating systems, e.g., Unix, may be used in connection with the distributed storage architecture described herein. Furthermore, the file array software architecture described herein may be configured to be ported across different adapters and buses.

As shown in FIG. 4, the client file system 420 comprises a file array client software driver component 422 that interfaces with a communications manager software component 430; these components execute on the host CPU 312 and share host memory 330. The file array client 422 conforms to IFS and interfaces to the Windows NT operating system in a manner similar to other supported file systems. In other words when plugged into the Windows NT operating system, the client file system 420 supports all base requirements of the operating system including object modeling and cache management. The communications manager 430 exchanges and processes I/O requests/responses over the PCI bus 302 with one or more file array adapters 350.

The server file system 450 is configured to optimize and execute I/O requests and, to that end, comprises a plurality of software code components that interface with a communications manager 440 of the adapter. The communications manager 440 provides a communications interface and complement to the manager 430 of the host computer. The file array architecture defines the communications interface as a transport for transporting file array information block (FIB) packets across the interface 302 between the client and server file systems. An example of a communications interface suitable for use with the present invention is described in copending and commonly-assigned U.S. patent application Ser. No. 08/963,902, now U.S. Pat. No. 6,009,478, entitled File Array Communications Interface.

The server file system 450 comprises a file array server driver component 452, a cache manager 454 and NVRAM manager 456. The NVRAM manager 456 is a software entity that interacts with the NVRAM 390 to manipulate file system metadata and reduce disk accesses, as described below. The file array server 452 provides a framework for scheduling, staging, executing and returning completed I/O operation results to the file array client 422. The file array server 452 is multi-threaded in that it manages a plurality of simultaneous in-process I/O requests while reducing the number of I/O interrupts to the host operating system. As the number of threads of execution increase, file system throughput also increases (i.e., there are more I/O requests per second). Unlike prior art storage architectures that actually induce latency as throughput increases, a goal of the file array server is to allow the distributed file array architecture to maintain constant latency in these situations.

As noted, the server file system 450 embodies underlying resources that enable asynchronous operation with respect to the host computer so as to provide high data availability and increased system bandwidth while reducing host CPU interaction. The server satisfies 10 transactions received from the client by issuing detailed requests to a container manager 482 of the I/O subsystem 480 and the cache manager 464. The file array cache manager 464 is a software entity that implements a "user data" adapter cache 375 to improve application performance. When data is written to the adapter cache in response to a write operation, the cache manager 464 acknowledges the I/O request and returns control to the application without waiting for the data to be stored on disk. The cache manager 464 also cooperates with the client file system 410 to implement various caching strategies using the host and adapter caches. For example, the adapter cache 375 may be used with the host cache 335 in a complementary configuration to implement various adaptive algorithms that utilize adapter resources ahead of or behind those of the host computer, as described further herein.

The file array I/O subsystem 480 comprises the container manager 482, a channel manager 484 and a hardware abstraction layer (HAL) 486. The channel manager 484 implements protocols for communicating with the disk drives over channels of the adapter and, to that end, performs the functions of a conventional class driver, device-specific drivers, e.g., a small computer system interface (SCSI) drivers, and port drivers. HAL 486 directly manipulates the file array hardware, including the port interface circuitry of the adapter I/O unit 360, and insulates the file array software components from hardware details to facilitate upgrading or porting of the software to other hardware platforms.

The container manager 482 is a software entity that manages containers and oversees certain operations, such as parity calculations. As described further herein, containers consist of space from one or more disks and are the logical units of storage for the file system, as well as the units of data organization for, e.g., various RAID implementations; this allows the container manager to efficiently map file system addresses to disk addresses. Because the container manager 482 is independent of the server file system 450, the file array adapter 350 can be used either as a file system controller or, in an alternate embodiment, as a block I/O controller. In this latter embodiment, the server file system 450 is bypassed and I/O requests occur directly between the communication manager 440 and container manager 482; this is denoted in FIG. 4 by the communications manager overhanging the underlying server file system 450.

The physical configuration of the file array adapter is defined by the number of disks attached to each data channel whereas the logical configuration is defined by data containers that are superimposed on the physical disk configuration. Specifically, the logical configuration consists of a hierarchy of three elements: partitions, data containers and multi-level data containers. Partitions are basic building blocks that provide a high-degree of flexibility in allocating disk space. When disks are first initialized as file array volumes, their blocks are defined as "free space". Partitions are constructed from contiguous areas of free space and are thereafter associated with data containers.

The file array logical configuration makes the physical disks transparent to the operating system which only "sees" data containers and multi-level data containers as logical drive letters. That is, the containers and multi-level containers are visible to applications as drive letters with linear address spaces. Data containers are composed of partitions and can consist of a single partition on a single disk or span partitions across disks on multiple data channels. A multi-level data container is a "container of containers".

Figure 1:
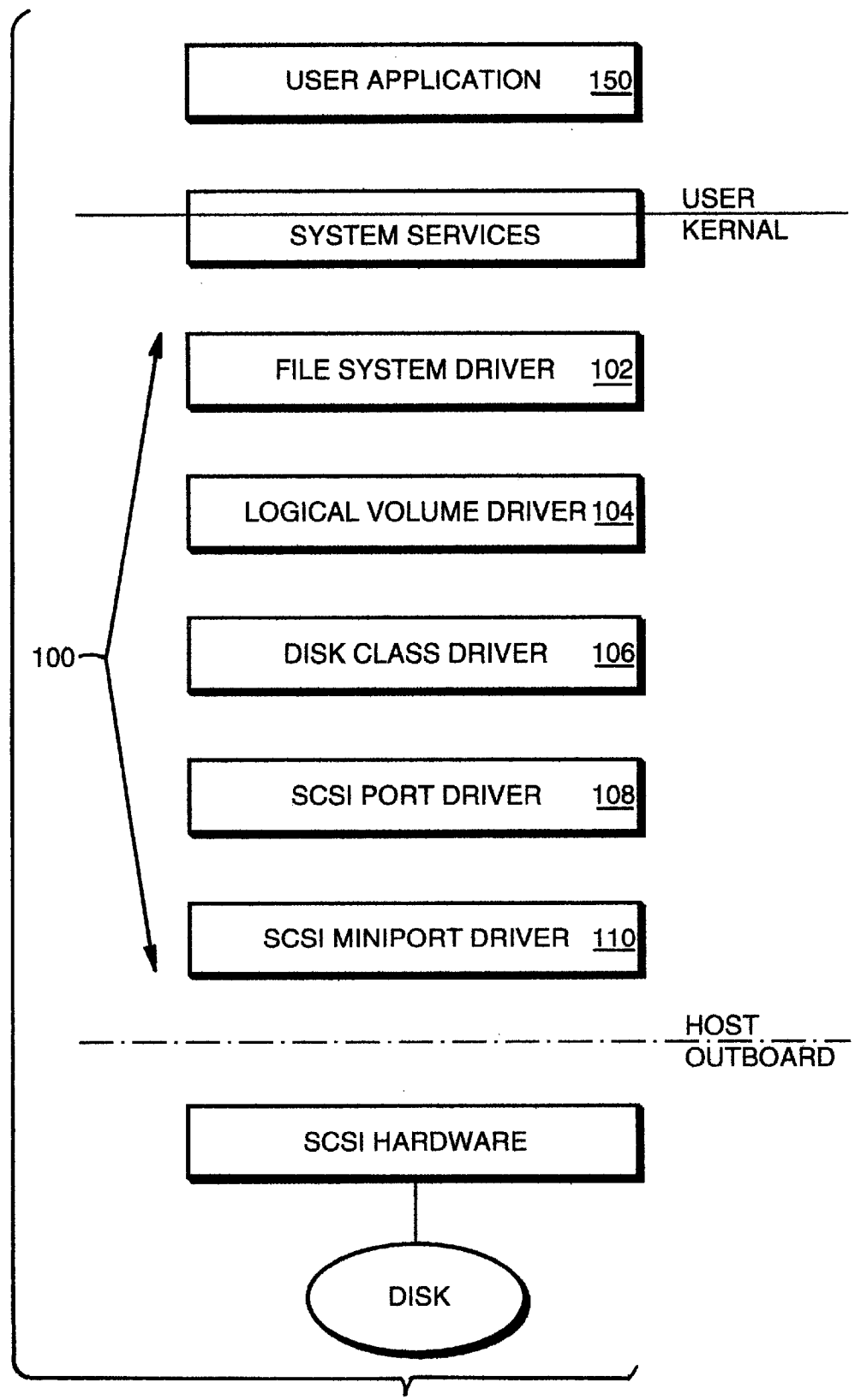
FIG. 1 is a schematic block diagram of a conventional I/O stack of a storage architecture comprising a file system and an input/output (I/O) subsystem.
Figure 2C:
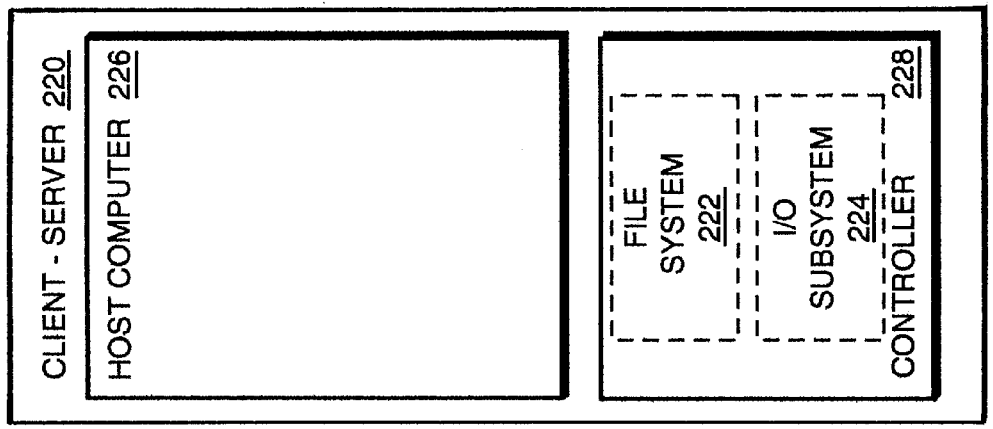
FIGS. 2A–2C are block diagrams illustrating the organizations of file systems and I/O subsystems of conventional storage architectures.
Figure 2B:
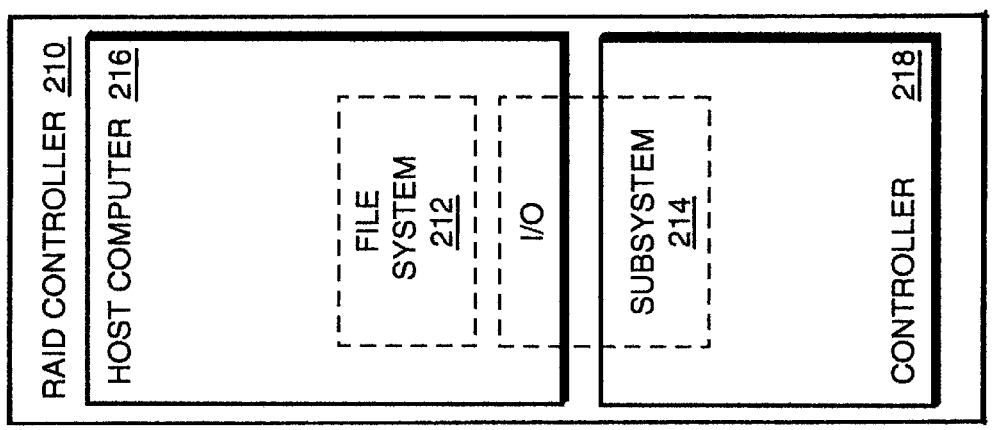
Figure 2A:
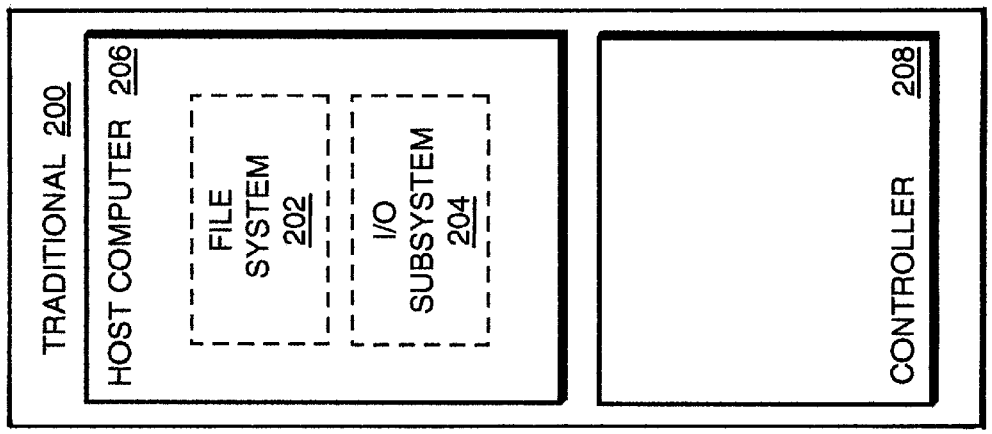

As noted in FIG. 1, I/O operations traverse I/O stack 100 of conventional storage architectures that include a file system driver, logical volume driver, disk class driver, and port and miniport drivers before accessing any hardware. In many cases, the I/O stack is host resident; the I/O operations traversing the stack "burns" host CPU processing cycles and requires repeated message exchanges with the I/O manager of an operating system, such as Windows NT. Moreover, there is a return path through the stack of drivers with the requested data or a write acknowledgment.

According to an aspect of the invention, the code path through the file array file system 410 and I/O subsystem 480 software stack is consolidated and optimize and, for a significant portion of the I/O stack, moved outboard to the file array adapter 350. Only the file array client 422 (which is equivalent to the file system driver 102) is resident on the host computer 310 and, thus, consumes host CPU 312 processing cycles. Since servicing of interrupts requires use of significant host computer overhead, the file array architecture 400 reduces interrupts by performing few high-level file system requests as opposed to many block-oriented requests.

NVRAM:

To avoid duplicating resources, the cache manager 454 and NVRAM manager 456 may interact to share the NVRAM 390 as a cache for the metadata and user data. The file array system implements a user data, write-back cache wherein, to improve application performance, write data is posted to the NVRAM 390 and is thereafter written to disk when idle cycles are available in the I/O subsystem 480.

As noted, the NVRAM manager 456 interacts with the NVRAM 390 to manipulate file system metadata; operations directed to metadata are implemented in accordance with a transaction model described herein. In general, the NVRAM manager logs and stores these operations from the time files are opened until they are closed in NVRAM. File array algorithms delay writing the metadata operations to disk until the adapter's processor and channel resources are available or until it is necessary to flush the NVRAM. In the event of a server crash, interim changes to the metadata are preserved in the NVRAM until the operations are restored.

The client file system may further utilize the NVRAM to optimize write operations that would otherwise be directed to disk. For example, if a database application issues a commit write traction, the file system interprets this request as a committed write operation. In response to the request, the file array client 422 writes the data associated with the operation to the NVRAM 390 and responds to the application that the transaction has completed. The server file system 450, in effect, guarantees to the client file system 420 (on behalf of the database application) that in the event of a failure, the data associated with the committed write operation will be written to disk.

Similarly, the server file system 450 may utilize the NVRAM to log changes to the file system metadata. The file system is generally a simple database consisting of, e.g., inodes and vnodes, and users of the file system cannot access certain files until the metadata is coherent. As a result, the file system actually has the same type of semantics as a database, e.g., cannot proceed until this data is committed, and the server file system uses NVRAM for the commit.

Distributed Nature of File Array Architecture:

A novel aspect of the architecture relates to the separation between the client file system 420 and the server file system 450, and the fact that these systems operate independent of one another. The client and server file systems manage their caches, service I/O transaction requests and implement adaptive read-ahead and write-behind algorithm operations. For example, instructions and data associated with many 10 transaction requests are likely to be stored in the host cache. According to the distributed nature of the file array architecture, the client file system preferably services those I/O transaction requests at the host CPU 312 independent of the server file system. However, file creation occurs with cooperation between the client and server file systems; both file systems may thereafter operate on the created files.

Each opened file is considered an I/O data stream having its own state. If a particular data stream requires significant I/O processing, the logic comprising the file array system dedicates appropriate resources to that stream. If there is no contention for these resources, the I/O stream (i.e., thread) is allocated all of the resources it requires; if there is contention, an attempt is made to maximize total throughput. Independent of each stream, the file system attempts to perform effective read-ahead and write-behind operations.

In another aspect, the client file system 420 provides hints to the server file system 450 about characteristics of the files. For example, the client file system may characterize a file of a particular type having characteristics such as (i) write sequentially, (ii) predetermined size and (hii) likelihood of application waiting for the transaction to complete. These are generally powerful a priori determinations because there is no latency incurred while determining the characteristics of a file. The file array client 422 attaches these attributes to the file to inform the server file system 450 of the characteristics associated with the file; the server may then modify its adaptive algorithms to conform with those hints.

The file array system 410 also collects statistics to exploit the distributed nature of the architecture. These statistics generally relate to (i) sequentiality, (ii) cache hit rates, (iii) contention for determining read-ahead aggressiveness, (iv) cache thrashing and (v) bypassing of adapter cache. Because of the dynamic nature of the cache and the possibility of multiple processors running a file system (each independent of one another to some extent), the server file system uses these statistics to determine whether to send information to the client file system before the client requests the information. For example, the server file system may determine that there is bandwidth available on the SCSI channels and that it is likely that the client file system may request certain information. Accordingly, the DMA engine 356 transfers the information obtained from disks directly into host memory 330 so that it is available at the host if and when it is requested.

The distributed file array system 410 also optimizes use of host CPU resources as a result of parallelism inherent in the architecture. As noted, the host CPU is substantially consumed in some prior systems when executing software code of the I/O stack; by offloading execution of a significant portion of that code onto the file array adapter 350, the host computer 310 preserves resources that may be utilized for other processing operations. The parallelism ingrained within the file array architecture enables the client and server file systems to function collectively and independently so as to achieve advantages and optimizations of a truly distributed file system, as illustrated by the flowchart of FIG. 5.

Figure 5:
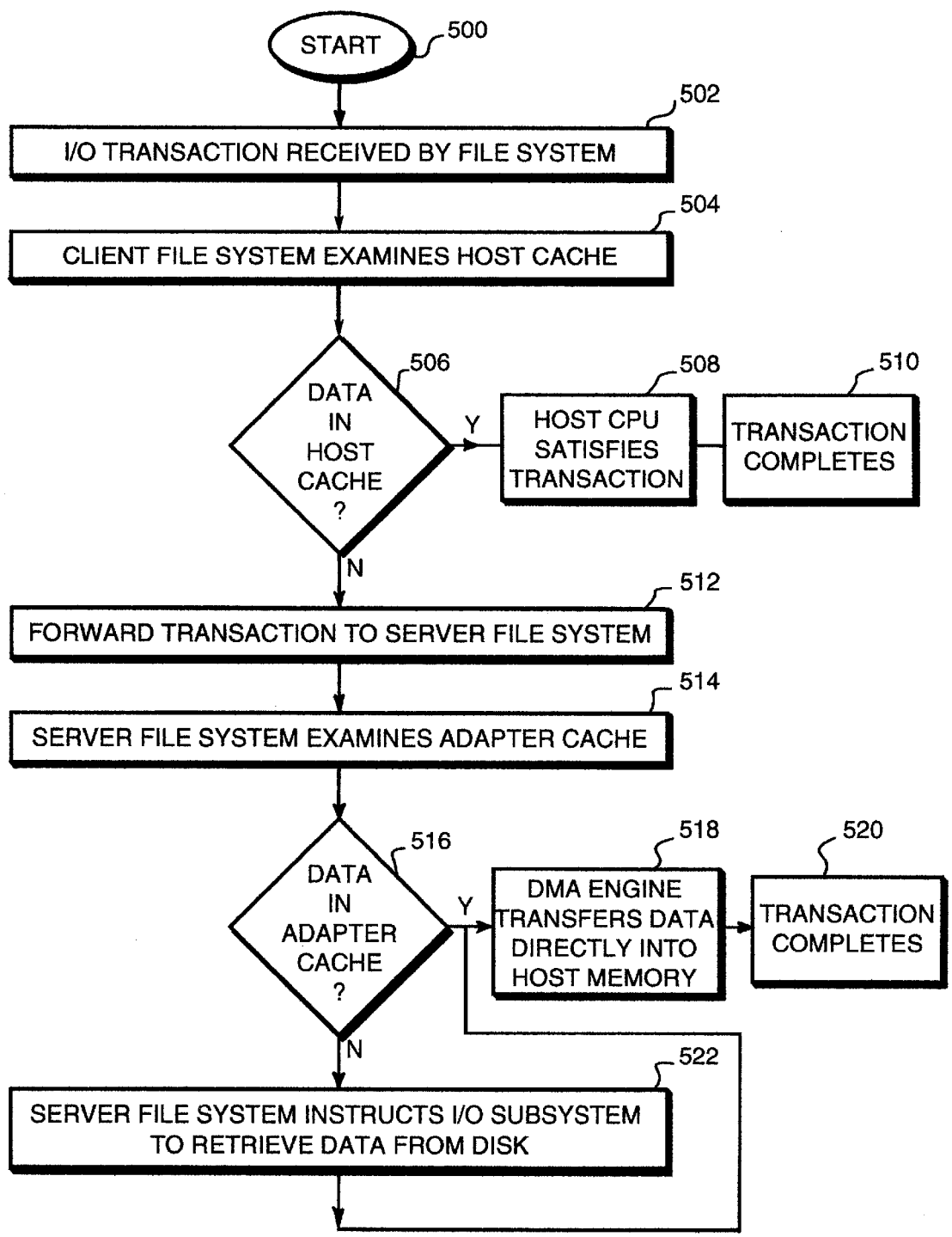
FIG. 5 is a flowchart depicting the sequence of steps for servicing an I/O read transaction in accordance with the distributed nature of the file array architecture.

FIG. 5 is a flowchart depicting the sequence of steps for servicing an I/O transaction in accordance with the distributed nature of the file array architecture. The sequence start at Step 500 and proceeds to Step 502 where an I/O transaction, such as a read transaction request, is issued by user application 150 and received by the file array file system 410. In Step 504, the client file system 420 interacts with the host cache 335 in an attempt to resolve the read request at the host computer 310. If the data associated with the read request is present in host memory cache (Step 506), then the host CPU satisfies the request in Step 508 and the transaction completes in Step 510. In this case, the client file system 420 does not communicate with the server file system 450 to complete the transaction.

If the requested data is not in host cache 340 (Step 506), the read request is forwarded by the client file system 420 over the interface 302 to the server file system 450 in Step 512. Here, the adapter CPU 352 services the request asynchronously to host CPU execution; that is, the file array adapter 350 functions as a parallel processor of the data processing system 300. In Step 514, the server file system 450 attempts to service the request within the adapter cache 375. If the data is present in the cache 375 (Step 516), the adapter CPU retrieves it and invokes the DMA engine 356 to transfer the data directly into host memory 330 in Step 518. The server file system notifies the client file system that it has searched the transaction via a response message over the interface 302 and, in Step 520, the transaction completes.

If the data is not present in the adapter cache (Step 516), the server file system 450 issues an I/O data transfer request to the I/O subsystem 480 which retrieves the data from disk 325 in Step 522. Once retrieved, the data is loaded into adapter memory 370 and the process returns to Step 518 where the DMA engine 356 transfers the requested data directly into host memory 330 via a DMA operation. The server file system then notifies the client file system via a response message over the interface 302 that it has serviced the transaction and, in Step 520, the transaction completes.

The adapter 350 may operate in parallel with the host computer 310 because execution of I/O operations generally do not require synchronization with host processor operation; such parallel execution not only "frees" the host CPU 312 for other processing operations, it also facilitates scaling of host CPUs for, e.g., symmetrical processing configurations. By shifting the burden of transaction implementation onto the adapter, the number of host CPU interrupts is reduced; in general, the file system need only interrupt the host CPU 312 once when a transaction completes. By limiting the frequency of CPU interruption and reducing the amount of code that the host executes, the file array architecture provides a substantial data processing performance enhancement.

As described above, the inherent parallelism of the file array architecture facilitates functional decomposition of data processing operations. Often the host CPU 312 may execute only a portion of an I/O transaction and then "handoff" the transaction to the adapter CPU 352. Communication between the client and server file systems, as defined by the file array protocol interface, manifests as a single transaction across the bus interface 302 that eventually "fans out" to multiple transfers/tasks at the adapter 350. This interface facilitates functional decomposition, i.e., apportioning a transaction into separate, individual tasks that can be performed across functional boundaries.

Figure 6:
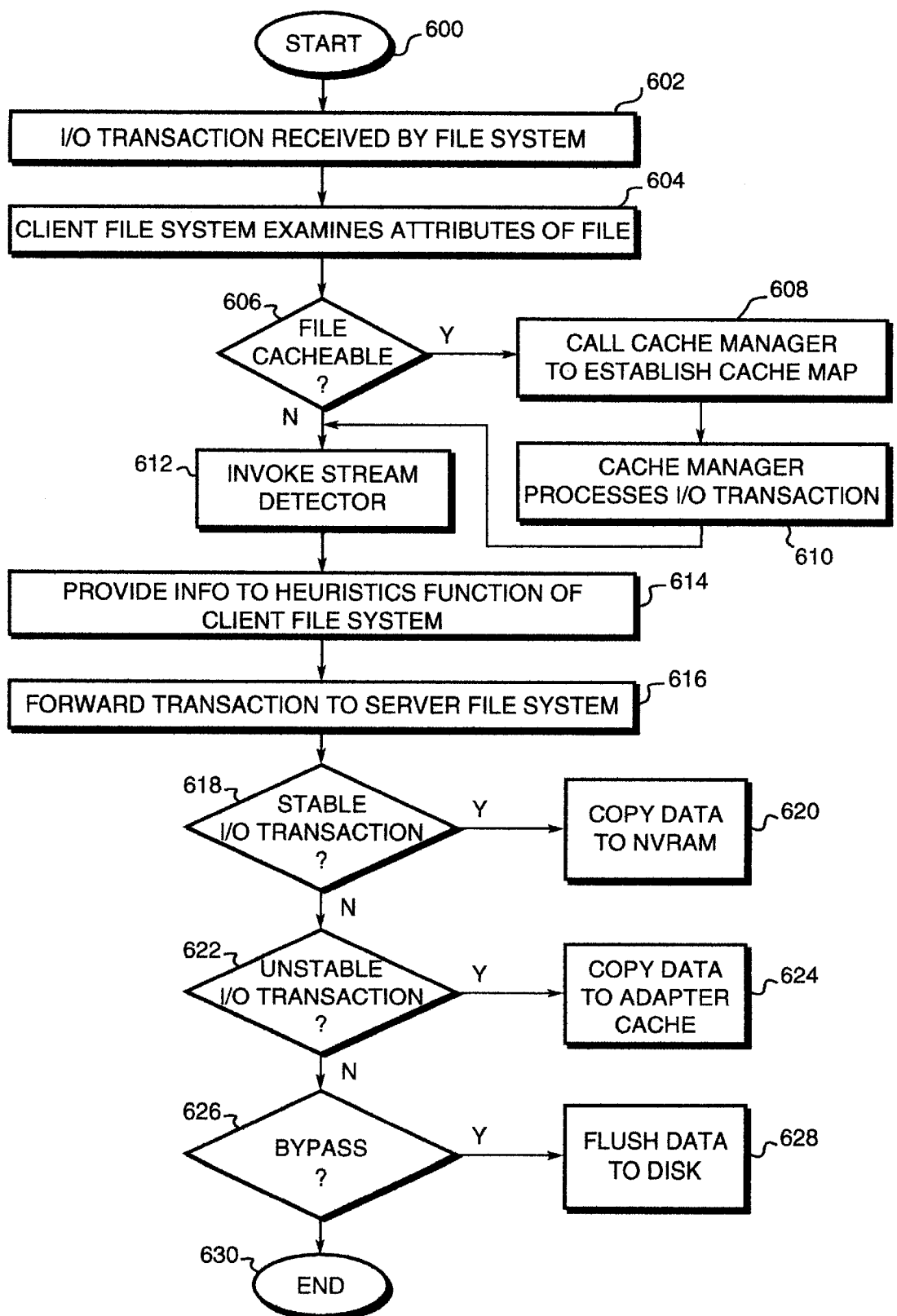
FIG. 6 is a flowchart depicting the sequence of steps for servicing an I/O write transaction in accordance with the distributed nature of the file array architecture.

Another example of the distributed nature of the file array architecture is illustrated in FIG. 6 which is a flowchart depicting the sequence of steps for servicing an I/O transaction, such as a write transaction request. The sequence starts at Step 600 and proceeds to Step 602 where the write request is issued by a user application 150 and received by the file array file system 410. In Step 604, the client file system 420 examines a number of attributes or flags of a file associated with the request and passed to the client via an applications programming interface (API) from the application 150. For example, the flags may indicate (i) whether the write request is asynchronous or synchronous; (ii) whether the request is stable or unstable; (iii) whether the request is sequential or random; (iv) whether the request is cacheable; (v) the file size associated with the request; (vi) the current number of outstanding I/O requests in the file system (i.e., a count of the number of user requests currently in the file system); and (vii) the type of disk container related to the request. It should be noted that for a stable write request, the application expects a completion response from the file system only when the write data is committed to stable storage.

For the first I/O transaction to the file, the client file system 420 determines whether the file is cacheable in Step 606 and, if so, calls a cache manager of the operating system 332 in Step 608 to establish a cache map. The cache map informs the cache manager of the location and attributes of the file. One attribute passed to the cache manager is a flag indicating whether the request is sequential, e.g., a FO_SEQ_Only flag. This flag may have been passed to the client file system from the user or the client may determine that the request is sequential based on the examined attributes. For example, if the count of outstanding I/O requests are small (indicating that there is not much activity in the file system) and the file size of the request is s small (indicating that the file may fit in the cache), the client may alter the state of the FO_SEQ_Only flag to force a sequential hint; this results in aggressive caching by the cache manager of the operating system.

In Step 610, the client file system interacts with the cache manager (and host cache 335) to process the write request. The cache manager includes processes (threads of execution) to implement read-ahead and writebehind algorithms in accordance with characteristics of the file. The actual functions of the cache manager when implementing read-ahead or writebehind operations are operating system dependent; in the illustrative embodiment, the client file system instructs the cache manager when to initiate aggressive caching and when to suspend such actions. For example, assertion of the sequential flag forces the cache manager to aggressively "write-out" the file to the adapter.

If the file is not cacheable (Step 606) or the request is from the cache manager, the client invokes a stream detector in Step 612 to determine, among other things, whether the file is sequential. The stream detector provides "predicting" information as to whether the request is a sequential access and how long it has been sequential (for purposes of determining how much more it will be sequential). In Step 614, the predicting information together with other information (such as container type, current number of outstanding I/O requests in the file system, current request size) are provided to a heuristics function (not shown) of the client file system to provide hints to the adapter. These hints indicate (i) whether the request is a read or write request; (ii) whether the request is sequential; (iii) if sequential, how much and how long; (iv) whether the request is latency-sensitive; and (v) whether the request can bypass the cache entirely. As for the latter hint, if the request is not sequential (i.e., it is random) and the request size is large, the file array client may instruct the server file system to bypass the adapter cache 375 and Rio send the write data directly to disk.

In general, the adapter cache 375 may be disabled by the cache manager if the cache adds no value to a caching transaction; this results in an I/O stream bypassing the adapter cache and directly accessing the disks 325. Of course, the adapter cache may be re-enabled if it adds value to the caching transaction. Disablement of the adapter cache typically occurs during random loads or congestion in the file system.

In Step 616, the write request (and hints associated with the request) are forwarded by the client file system 420 over the interface to the server file system 450. An attribute provided to the server is whether the request is a stable write request, thus requiring that data be on stable storage (e.g., on a disk 325 connected to adapter 350 or in NVRAM 390) before the request completes, or an unstable write request that allows a response to return to the application before the data is committed into stable storage. In the case of an unstable write request, the write data is typically loaded into adapter cache 375 for later transfer to disk via the I/O subsystem.

The server file system 450 utilizes different properties of the adapter memory depending upon the type of write request received from the client file system. Specifically, if the client file system 420 requests a stable write operation (i.e., write data must be committed to stable storage before responding) in Step 618, then the data is copied to NVRAM before the server responds with a completion acknowledgement to the client (Step 620). If an unstable write operation is requested (i.e., write data does not have to be committed to stable storage before responding) in Step 622, the data is copied to adapter DRAM cache in Step 624. For a bypass request (Step 626), any overlapping data in the NVRAM and DRAM caches are flushed directly to disk with the write data in step 628; the client file system typically requests a bypass operation if the request is not a good candidate for caching. The sequence then ends in Step 630.

It should be noted that a goal of the file array architecture is to realize the largest I/O transfer sizes as possible; accordingly, small sequential requests are preferably consolidated in the adapter cache to create a larger I/O request that the server may send to the I/O subsystem. On the other hand, non-sequential (or random) requests are generally bypassed directly to disk.

File Array Caching:

In the illustrative embodiment, the adapter cache 375 has a storage capacity that is generally less than that of the host cache 335. Whereas the adapter cache is dedicated to the file array system, the Windows NT host cache is typically shared across n file systems. Such sharing makes it difficult to balance the host cache with the adapter cache in terms of, e.g., performance and usage (consumption) of memory with the underlying I/O subsystem and matching of algorithms such as read-ahead, write-behind and victimization. Attempts to implement these algorithms often go awry and, as a result, the I/O subsystem thrashes between the caches and storage devices because the desired data is not in the cache.

Because the file array I/O subsystem 480 manifests at the file system level of the architecture, the host cache 335 can be selectively, i.e., "on-the-fly", disabled using entry points into the file array client 422. Selective disablement of the host cache typically occurs when thrashing extends to that cache in order to satisfy requests for certain data. The server file system 450 may continue to perform read-ahead and write-behind operations using the adapter cache 375 to reduce thrashing at the host cache.

The adapter cache 375 may be used with the host cache 335 in a complementary configuration that enables certain algorithms to utilize the adapter resources "ahead of" or "behind" the host operating system in an adaptive manner. For example, the adapter cache may function as a secondary cache to satisfy refill requests from the primary, host cache in accordance with these adaptive algorithms. The cache manager 454 may determine that certain I/O requests are sequential and that the file system is not keeping up with the demand from the operating system; as a result, the cache manager 454 increases the magnitude of read-ahead operations directed to the disks to "apt" to the current situation. The data associated with subsequent transaction requests are therefore likely to be present in the host cache and, because of the distributed nature of file array system, the request can be serviced quickly at the host computer.

Figure 7A:
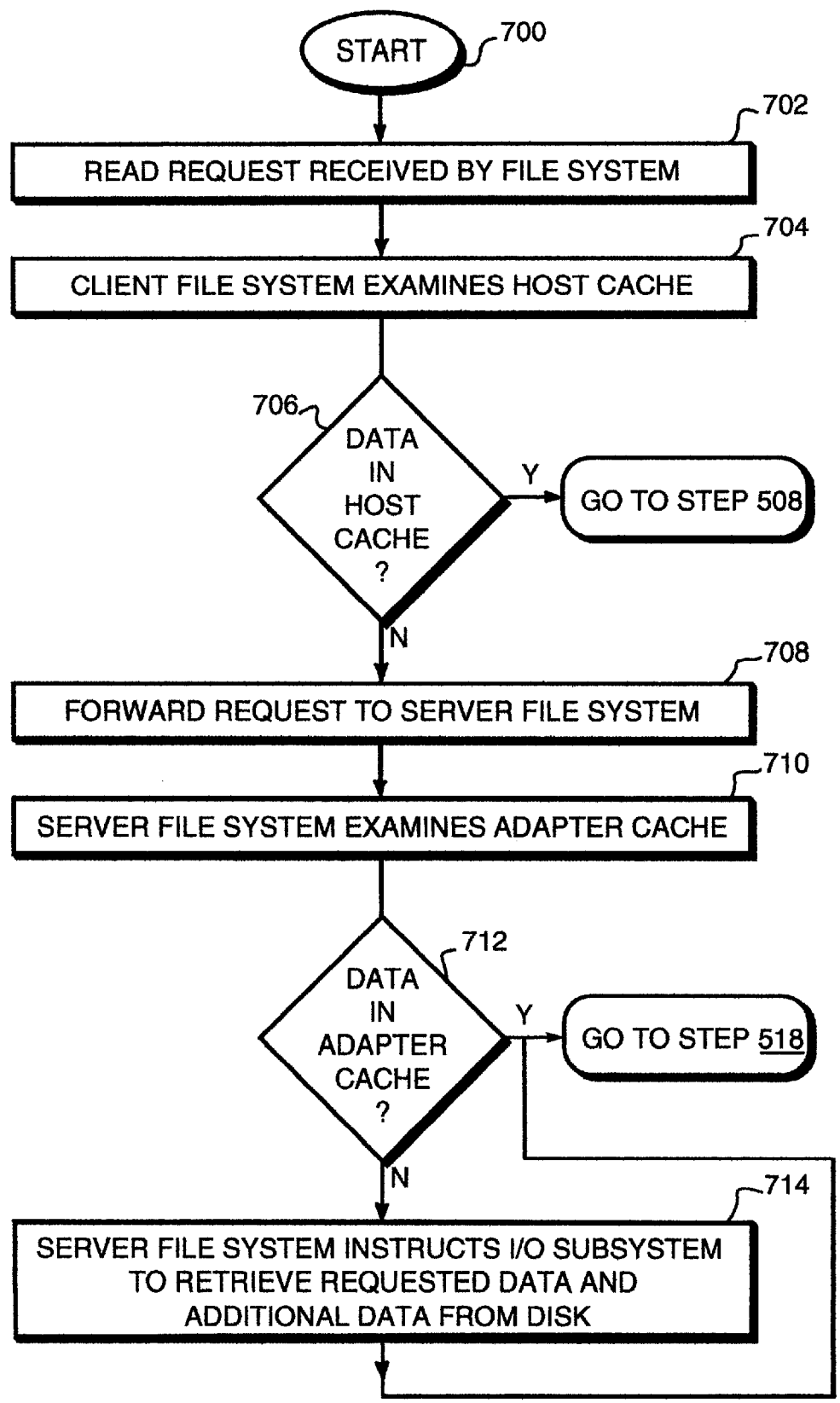
FIGS. 7A and 7B are flowcharts depicting the sequence of steps for servicing an I/O transaction in accordance with adaptive caching algorithms of the file array architecture.
Figure 7B:
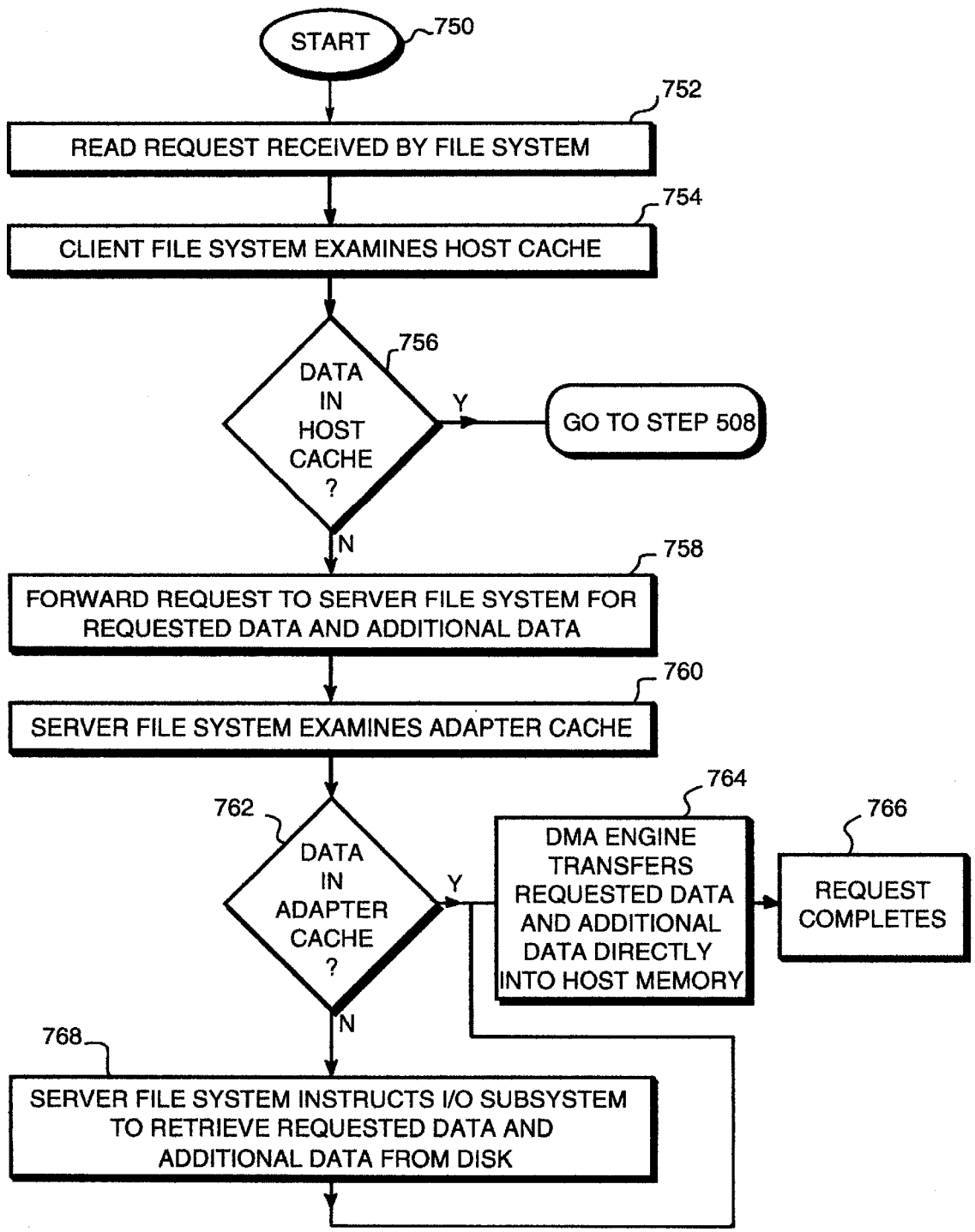

FIGS. 7A and 7B are flowcharts depicting the sequence of steps for servicing an I/O transaction in accordance with adaptive caching algorithms of the file array architecture. Note that the steps described for these flowchart may be a continuation of the steps described in the flowchart of FIG. 5. The sequence starts at Step 700 of FIG. 7A and proceeds to Step 702 where a subsequent read transaction request is received at the file system 420. In Step 704, the client file system examines the host cache and in Step 706, a determination is made whether the requested data is in the host cache 335. If not, the client file system sends the request to the server file system 450 in Step 708. In Step 710 the server file system examines the adapter cache 375 and in Step 712, a determination is made whether the data is present in that cache. Because the file array system monitors application data streams at the file system level, it recognizes that this is the second request of x size for, what may be sequential data requests. Accordingly, the server file system renders an informed guess that there will be subsequent requests for data of this size and, if the data is not being accessed (i.e., pending) in the adapter cache, increases the amount of data requested ("cached") from disk fromx to, e.g., 2x in accordance with a readahead algorithm. The server then instructs the I/O subsystem 480 to retrieve not only the requested data, but also additional data (Step 714) which it stores in the adapter cache 375. The server file system 450 then proceeds to complete its portion of the pending read request.

As noted, the file array file system 410 monitors application data streams at the file system level and caches read data when sequentially is detected. Since the file system is knowledgeable of the physical organizations of files on the disks, only those blocks that belong to files being processed are moved to the adapter cache; this results in significant cache hit rates.

Refer now to FIG. 7B. Upon receiving another read transaction request in Step 752, the client file system 420 examines the host cache 335 in Step 754 and determines that the requested data is not present in the cache (Step 756). This time, however, the client also realizes a possible sequential pattern and performs its version of a read-ahead operation in Step 758 by requesting 2x of data from the server file system 450 even though the actual read transaction requests x. The server file system examines the adapter cache in Step 760 and, if the data is present in the cache (Step 762), satisfies the entire 2x of data from the adapter cache 375 in Step 764. The request then completes in Step 766. If the data is not present in the cache (Step 762), the server continues execution of read-ahead operations to acquire additional data in advance now that it realizes that these requests are, in fact, sequential (Step 768). Note that the magnitude of these read-ahead operations may scale up or down.

Figure 8:
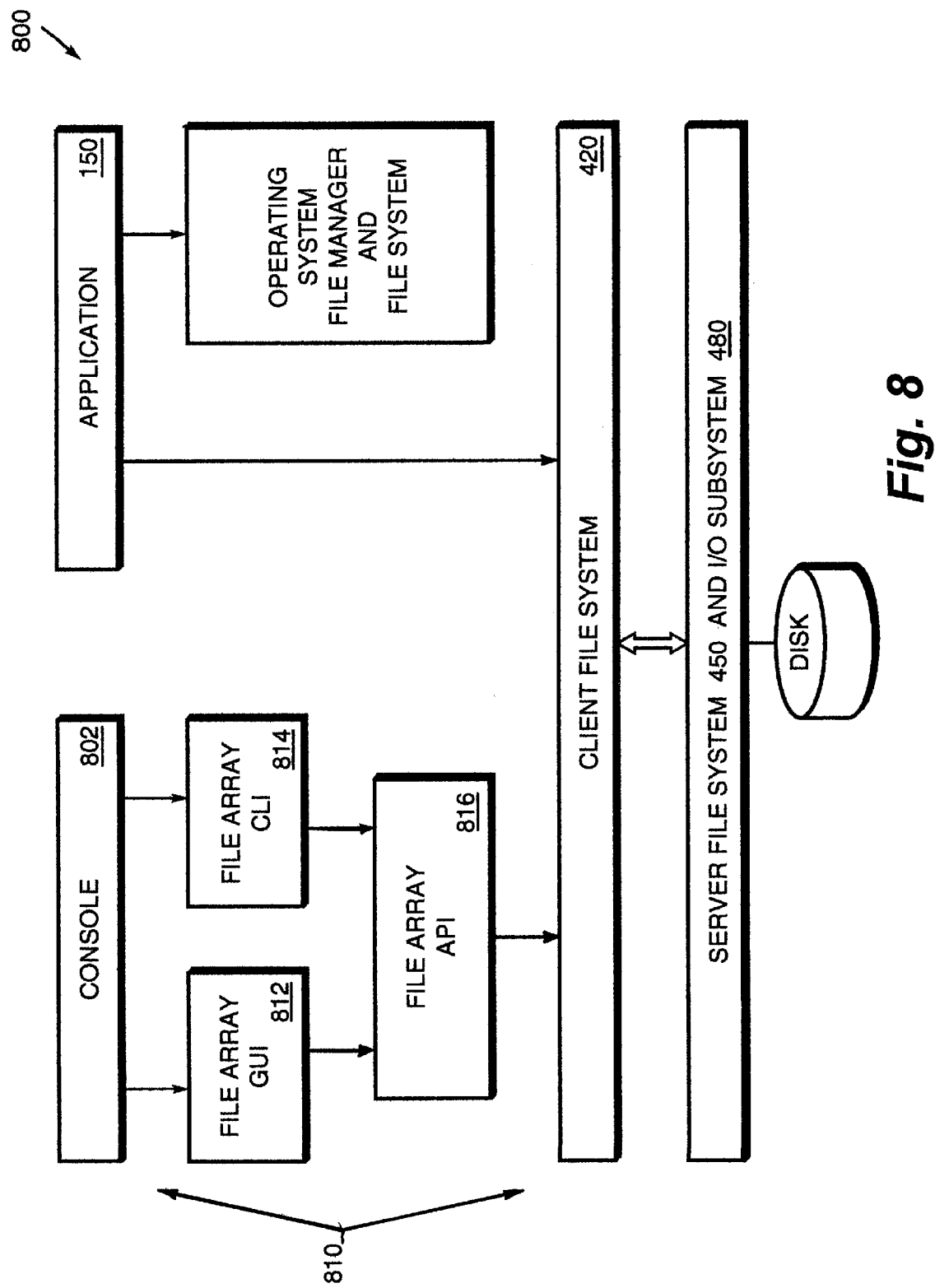
FIG. 8 is a schematic block diagram of an alternate embodiment of the file array architecture illustrating a file array configuration and management utility in accordance with the invention.

File Array Configuration and Management Tool:

In another aspect of the invention, the file array architecture comprises a configuration and management utility that provides a graphical user interface (GUI), a command line interface (CL) and an API for the data processing platform. FIG. 8 is a schematic block diagram of an alternate embodiment of the file array architecture 800 including the file array configuration and management utility tool 810 that enables local or remote "single step" management of storage devices by a user from a console 802 using components such as a file array GUI 812, a file array CLI 814 and a file array API 816. The file array tool 810 may be employed to create, delete, expand and promote data containers to multilevel containers in response to a single operation issued through the GUI.

Specifically, high-level configuration and management instructions may be provided to the data processing system by entering various commands through the file array CLI 814 or by manipulating icons and controls through the file array GUI 812. These commands are translated by the file array API 816 into discrete I/O operations for the file system 410. For most operations, a user interacts with the file array GUI 812 using simple drag-and-drop interactions or via display of dialog boxes; however, the user may also enter discrete parameters through the GUI when, e.g., configuring a file system. In this latter case, the file array tool 810 allows a user to configure storage by entering two parameters through the GUI: (i) the size of the desired file system, e.g., in megabytes or gigabytes; and (ii) the organization of the underlying storage devices, e.g., RAID, mirrored, striped, etc. In response to these entered parameters, the utility tool initiates the formation of a file system according to conventional methods of arranging disks in groups and laying down a file system, all the while without rebooting the system.

An advantage of the tool, however, is that it operates transparently to the user; since the file array architecture manifests at the user interface level, the concept of organizing a file system may be extended to on-line transformation of the underlying storage system without affecting the user's view of the system. This process of transforming the underlying storage system is called morphing and is advantageous because the user may continue to access data throughout the transformation process. Morphing may apply to any storage transformation, such as a stripe set to a 3-disk RAID set, or a 5-disk RAID set to a 10-disk RAID set.

Figure 9:
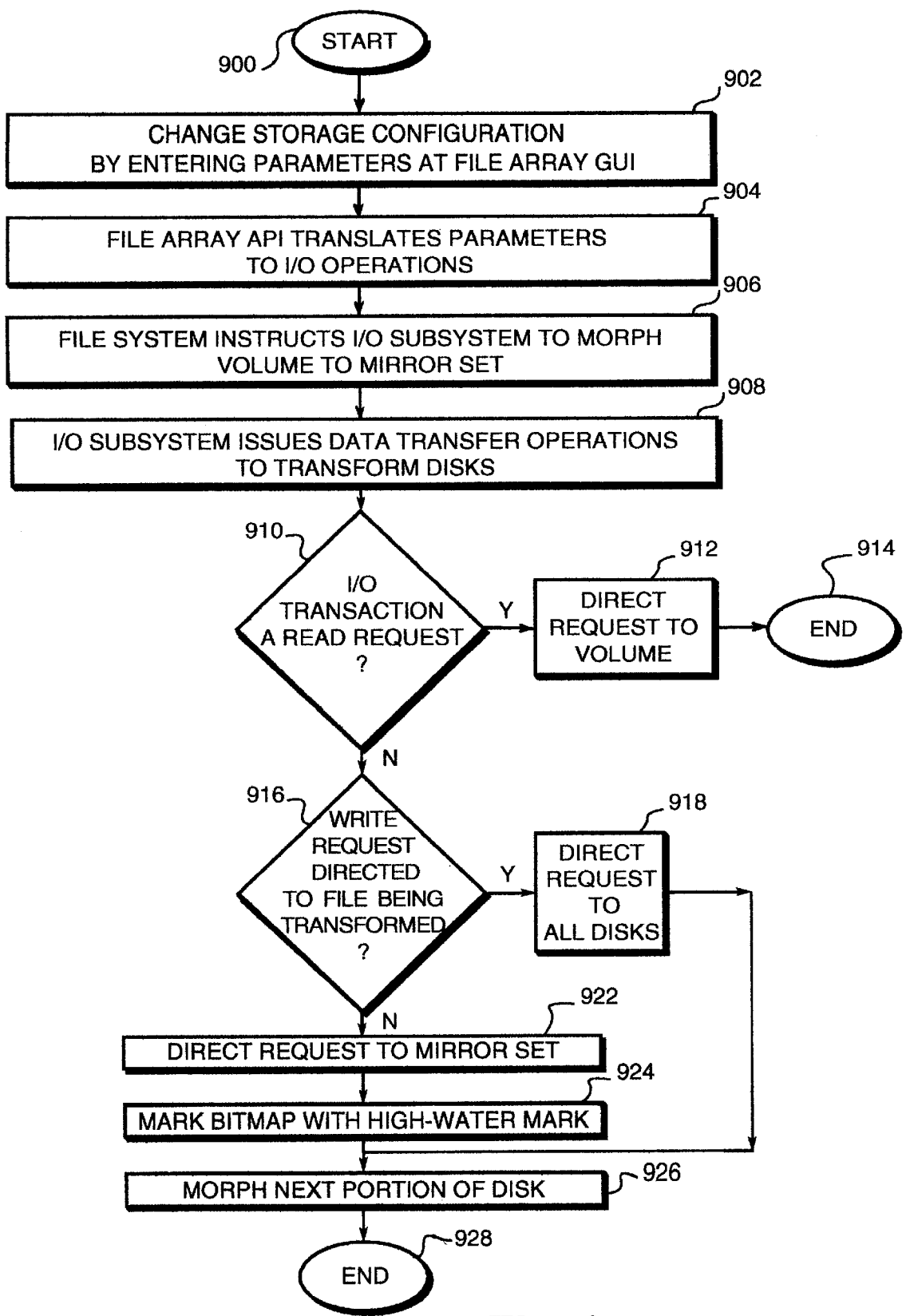
FIG. 9 is a flowchart illustrating the sequence of steps involved in an online morphing process according to the present invention.

FIG. 9 is a flowchart illustrating the sequence of steps involved in an online morphing process. The sequence starts at Step 900 and proceeds to Step 902 where a user enters parameters into the file array GUI interface to alter the underlying storage configuration from, e.g., a single disk volume to a dual mirror set. The file array API 816 translates these parameters into I/O operations provided to the file system 410 in Step 904 and in Step 906, the file system instructs the I/O subsystem 480 to morph the volume disk to a dual mirror set. In Step 908, the I/O subsystem begins issuing a series of data transfer operations to transform the disks; according to the invention, this transformation is transparent to the user in that the user may continue accessing (i.e., reading and writing) data to and from files.

During the morphing procedure, a container receives an I/O request to a particular file and, in Step 910 it is determined whether the request is a read transaction. If it is, the request is directed to the volume disk in Step 912 and the sequence ends at Step 914. If the transaction is a write request (Step 910), a determination is made whether the transaction is directed to a file that is in the process of being transformed (Step 916). If it is, the request is directed to all of the disks, i.e., the current volume and the mirror set, in Step 918.

If the write request is directed to a file that has yet to be morphed (Step 916), the write operation is directed to the new mirror set in Step 922 and the bit map is marked with a "high-water marke" to indicate the extent to which the volume has been morphed (Step 924). When this portion of the disk is reached during subsequent stages of morphing, the bit map indicates that it has already been morphed. Morphing then proceeds with the next portion of the disk in Step 926 and the sequence ends in Step 928.

The on-line morphing technique described above optimizes system performance while ensuring a consistent "view" of storage on behalf of the user. efficiencies associated with the novel technique may be generally overlooked because of the benefit obtained by having storage resources on-line during an otherwise long period of transformation time. Transformation of a volume to a mirror set in a conventional file system typically requires the system to be taken off-line during redistribution of the data for a period of time that may extend to hours depending on the capacity of the underlying storage system.

In summary, an advantage of the distributed file array architecture manifests in the ability to implement its file system in accordance with a client-server computing model that is scaleable in terms of I/O capacity and bandwidth. That is, performance of the file array system scales substantially linearly as additional file array adapters are coupled to the host computer; in contrast, the file system of a RAID storage architecture becomes a bottleneck for performance when multiple RAID controllers are added. The file array performance advantage provided by the distributed architecture is even more substantial when viewed in terms of server capacity, i.e., connecting additional clients or processing additional 110 transactions without increasing file system latency.

While there has been shown and described an illustrative embodiment of a file array storage architecture comprising a distributed file system that improves file system latency and increases efficiency of a host computer, it is to be understood that various other adaptations and modifications may be made within the spirit and scope of the invention. For example in an alternate embodiment of the invention, the file array storage architecture may be configured to facilitate storage management by organizing disks into logical groupings to achieve various performance and availability characteristics.

Figures 10A, 10B, 10C:
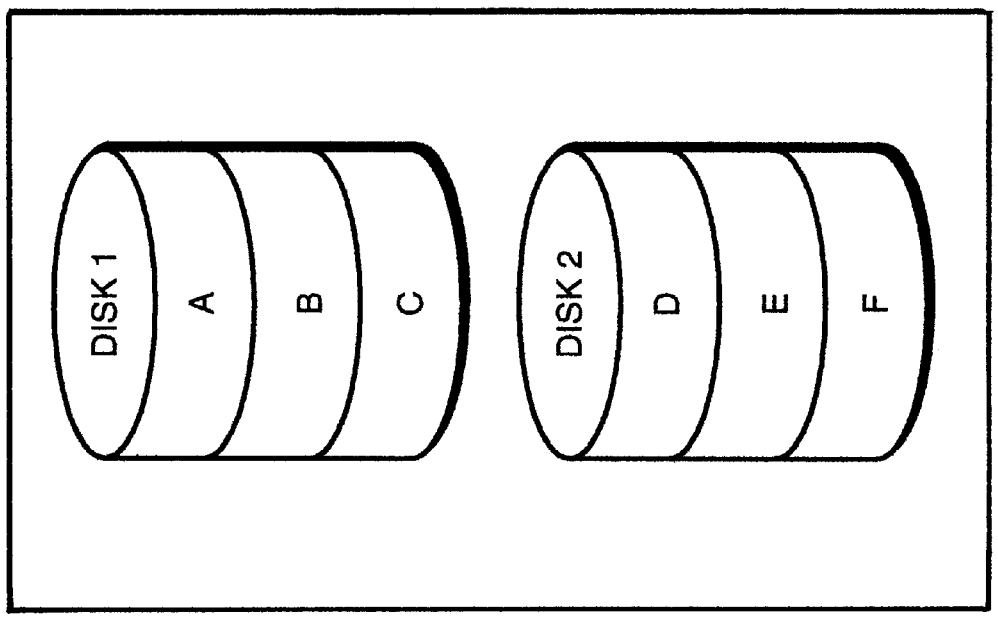
FIGS. 10A–10C are schematic diagrams illustrating various logical groupings of partitions on one or more disks according to the storage management capabilities of the file array architecture.

FIGS. 10A–10C are schematic diagrams illustrating the various logical groupings of partitions on one or more disks according to the storage management capabilities of the file array architecture. For example in FIG. 10A, partitions A, B, C can be disposed on disk 1 and partitions D, E, F can be disposed on disk 2, and each group of partitions can be further arranged into a container (logical volume). In FIG. 10B, partition A on disk 1 may be striped with partition D on disk 2, and thereafter logically grouped as a container.

Logical groupings may be further extended to allow nesting of containers. As shown in FIG. 10C, partition B on disk 1 and partition E on disk 2 can be organized as a mirror set via container C1, while partition C on disk 1 and partition F on disk 2 can be mirrored as container C2; containers C1 and C2 can then be striped in a nested fashion.

These logical configurations can become more complicated with arrangements such as a volume of containers, containers of containers, a volume of two mirrors (which is analogous to a concatenation of two mirrors) or a volume of two stripes (i.e., a concatenation of two stripes). Organizations of logical groupings may be created, e.g., by a system administrator, using the file array container manager 482 of the file array I/O subsystem 480.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A distributed storage architecture system comprising:
an interface;
a client file system executing on a host computer coupled to the interface, the host computer having a host central processing unit (CPU) connected to a host memory, the client file system one of interacting with the host memory to resolve an input/output (I/O) transaction request at the host computer and transmitting the I/O request over the interface;
a server file system executing on an adapter coupled to the interface, the server file system receiving the I/O request from the interface and servicing the I/O request asynchronously to execution of the host computer, the adapter having a CPU coupled to an adapter memory and a non-volatile random access memory (NVRAM) coupled to the adapter CPU, and wherein the server file system services the I/O request by interacting with the adapter memory to one of retrieve and store data specified by the I/O request;
an I/O subsystem executing on the adapter;
storage devices coupled to channels of the adapter; and
the server file system further including a NVRAM manager executed by the adapter CPU, the NVRAM manager interacting with the cache manager to share the NVRAM as a cache for user data and metadata.

2. The system of claim 1 wherein the server file system services the I/O request by instructing the I/O subsystem to interact with the storage devices to one of retrieve and store data specified by the I/O request.

3. The system of claim 1 wherein the client file system comprises a file array client driver executed by the host CPU.

4. The system of claim 1 wherein the interface is a bus.

5. The system of claim 3 wherein the server file system comprises a file array server driver executed by the adapter CPU.

6. The system of claim 5 wherein a portion of the host memory is configured as a host cache and wherein a portion of the adapter memory is configured as an adapter cache.

7. The system of claim 6 wherein the server file system further comprises a cache manager executed by the adapter CPU, the cache manager cooperating with the file array client driver to implement various caching strategies using the host and adapter caches.

8. The system of claim 1 wherein the storage devices comprise disks and wherein the I/O subsystem comprises a channel manager for implementing protocols over a channel of the adapter that enable communication between the disks and adapter.

9. The system of claim 4 wherein the bus comprises a peripheral component interconnect (PCI) bus and further comprising a first communications manager executing on the host computer and interfacing with the client file system to transport the I/O request over the bus to the adapter.

10. The system of claim 9 further comprising a second communications manager executing on the adapter and interfacing with the server file system to receive the I/O request from the bus.

11. A distributed storage architecture system comprising:
an interface;
a client file system executing on a host computer coupled to the interface, the host computer having a host central processing unit (CPU) connected to a host memory, the client file system one of interacting with the host memory to resolve an input/output (I/O) transaction request at the host computer and transmitting the I/O request over the interface;
a server file system executing on an adapter coupled to the interface, the server file system receiving the I/O request from the interface and servicing the I/O request asynchronously to execution of the host computer, the adapter having a CPU coupled to an adapter memory, and wherein the server file system services the I/O request by interacting with the adapter memory to one of retrieve and store data specified by the I/O request;
an I/O subsystem executing on the adapter;
storage devices coupled to channels of the adapter; and
wherein the I/O subsystem further comprises a hardware abstraction layer that manipulates port interface circuitry coupling the adapter to the disks.

12. The system of claim 11 wherein the I/O subsystem further comprises a container manager that manages containers of the file system, the containers constituting logical units of storage for the file system and unit of organization of data on the disks, thereby enabling efficient mapping of file system addresses to disk addresses.

13. A method for efficiently resolving an input/output (I/O) request within a distributed storage architecture system executing on a host computer coupled to an adapter, the method comprising the steps of:

issuing the I/O request, the I/O request comprising a read request, from an application program to a client file system of the distributed storage architecture system; determining whether data associated with the I/O request is present in a host cache of the host computer and, if so, servicing the I/O request at the host cache with the client file system;

if the data associated with the I/O request is not present in the host cache, forwarding the I/O request from the client file system to a server file system of the distributed storage architecture system;

examining an adapter cache of the adapter to determine if the data associated with the I/O request is present in the adapter cache and, if so, servicing the I/O request at the adapter cache with the server file system; and if the data associated with the read request is present in the adapter cache:

invoking a direct memory access (DMA) engine of the adapter to transfer the data directly to the host cache, and notifying the client file system that the read request has been serviced.

14. A method for efficiently resolving an input/output (I/O) request within a distributed storage architecture system executing on a host computer coupled to an adapter, the method comprising the steps of:

issuing the I/O request, the I/O request comprising a read request, from an application program to a client file system of the distributed storage architecture system; determining whether data associated with the I/O request is present in a host cache of the host computer and, if so, servicing the I/O request at the host cache with the client file system;

if the data associated with the I/O request is not present in the host cache, forwarding the I/O request from the client file system to a server file system of the distributed storage architecture system;

examining an adapter cache of the adapter to determine if the data associated with the I/O request is present in the adapter cache and, if so, servicing the I/O request at the adapter cache with the server file system; and if the data associated with the read request is not present in the adapter cache;

forwarding the read request from the server file system to an I/O subsystem of the distributed storage architecture system;

retrieving the data associated with the read request from a disk coupled to the adapter, and loading the data associated with the read request into the adapter cache.

15. The method of claim 14 further comprising the steps of:

invoking a direct memory access (DMA) engine of the adapter to transfer the data directly from the adapter cache to the host cache; and notifying the client file system that the read request has been serviced.

16. A method for efficiently resolving an input/output (I/O) request within a distributed storage architecture system executing on a host computer coupled to an adapter, the method comprising the steps of:

issuing the I/O request, the I/O request comprising a read request, from an application program to a client file system of the distributed storage architecture system, determining whether data associated with the I/O request is present in a host cache of the host computer and, if so, servicing the I/O request at the host cache with the client file system;

if the data associated with the I/O request is not present in the host cache, forwarding the I/O request from the client file system to a server file system of the distributed storage architecture system;

examining an adapter cache of the adapter to determine if the data associated with the I/O request is present in the adapter cache and, if so, servicing the I/O request at the adapter cache with the server file system; and if the data associated with the read request is not present in the adapter cache;

determining whether the read request is one of a plurality of sequential read requests; if so, instructing an I/O subsystem of the distributed storage architecture system to retrieve the data associated with the read request along with additional data;

retrieving the data associated with the read request along with the additional data from at least one disk coupled to the adapter, and loading the data and additional data into the adapter cache.

17. The method of claim 16 further comprising the steps of:

invoking a direct memory access (DMA) engine of the adapter to transfer the data and additional data directly from the adapter cache to the host cache; and notifying the client file system that the read request has been serviced.

18. The method of claim 17 further comprising the steps of:

issuing a subsequent read request from the application program to the client file system;

determining whether data associated with the subsequent read request is present in the host cache and, if not, determining whether the subsequent read request is one of a plurality of sequential read requests;

if so, requesting the data associated with the subsequent read request along with at least a portion of the additional data from the client file system to a server file system; and examining the adapter cache to determine if the data and the at least portion of the additional data is present in the adapter cache and, if so, servicing the requested data at the adapter cache with the server file system.

19. The method of claim 18 further comprising the steps of:

invoking a direct memory access (DMA) engine of the adapter to transfer the data and the at least portion of the additional data directly from the adapter cache to the host cache; and noting the client file system that the read request has been serviced.

20. The method of claim 19 further comprising the steps of:

issuing a write request and associated data from the application program to the client file system;

forwarding the write request and associated data from the client file system to the server file system;

determining that the adapter cache contains useful information and disabling the adapter cache;

passing the write request and associated data from the server file system directly to the I/O subsystem; and storing the data associated with the write request on the at least one disk.

21. A method for efficiently resolving an input/output (I/O) request within a distributed storage architecture system executing on a host computer coupled to an adapter, the method comprising the steps of:

issuing the I/O request, the I/O request comprising a read request, from an application program to a client file system of the distributed storage architecture system; determining whether data associated with the I/O request is present in a host cache of the host computer and, if so, servicing the I/O request at the host cache with the client file system, if the data associated with the I/O request is not present in the host cache, forwarding the I/O request from the client file system to a server file system of the distributed storage architecture system;

examining an adapter cache of the adapter to determine if the data associated with the I/O request is present in the adapter cache and, if so, servicing the I/O request at the adapter cache with the server file system; and wherein the step of determining comprises the step of calling a cache manager to establish a cache map.

22. A method for efficiently resolving an input/output (I/O) request within a distributed storage architecture system executing on a host computer coupled to an adapter, the method comprising the steps of:

issuing the I/O request, the I/O request comprising a read request, from an application program to a client file system of the distributed storage architecture system; determining whether data associated with the I/O request is present in a host cache of the host computer and, if so, servicing the I/O request at the host cache with the client file system;

if the data associated with the I/O request is not present in the host cache, forwarding the I/O request from the client file system to a server file system of the distributed storage architecture system;

examining an adapter cache of the adapter to determine if the data associated with the I/O request is present in the adapter cache and, if so, servicing the I/O request at the adapter cache with the server file system; and wherein the step of examining comprises the step of flushing overlapping data in the cache to disk along with data associated with the write request in accordance with a bypass operation.

23. A method for efficiently resolving an input/output (I/O) request within a distributed storage architecture system executing on a host computer coupled to an adapter, the method comprising the steps of:

issuing the I/O request from an application program to a client file system of the distributed storage architecture system;

determining whether data associated with the I/O request is present in a host cache of the host computer and, if so, servicing the I/O request at the host cache with the client file system;

if the data associated with the I/O request is not present in the host cache, forwarding the I/O request from the client file system to a server file system of the distributed storage architecture system;

examining an adapter cache of the adapter to determine if the data associated with the I/O request is present in the adapter cache and, if so, servicing the I/O request at the adapter cache with the server file system; and if the write request is a stable write request, copying the data associated with the request to non-volatile random access memory.

24. A method for efficiently resolving an input/output (I/O) request within a distributed storage architecture system executing on a host computer coupled to an adapters the method comprising the steps of:

issuing the I/O request from an application program to a client file system of the distributed storage architecture system;

determining whether data associated with the I/O request is present in a host cache of the host computer and, if so, servicing the I/O request at the host cache with the client file system;

if the data associated with the I/O request is not present in the host cache, forwarding the I/O request from the client file system to a server file system of the distributed storage architecture system;

examining an adapter cache of the adapter to determine if the data associated with the I/O request is present in the adapter cache and, if so, servicing the I/O request at the adapter cache with the server file system: and if the write request is an unstable write request, copying the data associated with the request to the adapter cache.

* * * * *